United States Patent
Miller et al.

(10) Patent No.: US 8,230,086 B2
(45) Date of Patent: Jul. 24, 2012

(54) HIDDEN GROUP MEMBERSHIP IN CLUSTERED COMPUTER SYSTEM

(75) Inventors: Robert Miller, Rochester, MN (US);
Kiswanto Thayib, Rochester, MN (US);
John Christian Unterholzner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 11/764,550

(22) Filed: Jun. 18, 2007

(65) Prior Publication Data

US 2008/0313330 A1 Dec. 18, 2008

(51) Int. Cl.
*G06F 15/16* (2006.01)
*G06F 15/177* (2006.01)

(52) U.S. Cl. ........ 709/229; 709/201; 709/202; 709/203; 709/220; 709/221; 709/222; 709/227; 709/228

(58) Field of Classification Search .......... 709/201–203, 709/220–222, 227–229
See application file for complete search history.

(56) References Cited

U.S. PATENT DOCUMENTS

| | | | | |
|---|---|---|---|---|
| 7,035,858 | B2* | 4/2006 | Dinker et al. .......................... 1/1 |
| 7,587,475 | B2* | 9/2009 | Koneru .......................... 709/221 |
| 7,792,137 | B2* | 9/2010 | Smith et al. .................... 370/447 |
| 7,839,523 | B2* | 11/2010 | Tredoux et al. ............... 358/1.15 |
| 2002/0049859 | A1* | 4/2002 | Bruckert et al. ............... 709/246 |
| 2002/0120757 | A1* | 8/2002 | Sutherland et al. ........... 709/229 |
| 2002/0161768 | A1* | 10/2002 | Miller et al. ....................... 707/9 |
| 2003/0028594 | A1* | 2/2003 | Laschkewitsch et al. ..... 709/204 |
| 2003/0055614 | A1* | 3/2003 | Pelikan et al. ..................... 703/2 |
| 2004/0010538 | A1* | 1/2004 | Miller et al. .................... 709/201 |
| 2010/0128879 | A1* | 5/2010 | Zou et al. ....................... 380/282 |

OTHER PUBLICATIONS

Karan Bhatia, Peer-To-Peer Requirement on the Open Grid Services Architecture Framework, Jul. 12, 2005, pp. 1-35.*
M. Bechler, A Cluster-Based Security Architecture for Ad Hoc Networks, 2004, IEEE, pp. 1-11.*
Werner Vogels, The Design and Architecture of the Microsoft Cluster Service-A Practical Approach to High-Availability and Scalability, Sep. 2, 1998, Microsoft, pp. 1-11.*

* cited by examiner

*Primary Examiner* — Hieu Hoang
(74) *Attorney, Agent, or Firm* — Wood, Herron & Evans LLP

(57) ABSTRACT

An apparatus, program product and method utilize hidden group membership to facilitate the processing of originator requests to a group in a clustered computer system. With hidden group membership, a requesting originator is temporarily joined to a group in such a manner that the originator is both hidden and provided with limited access rights, e.g., so that some of the messages sent by the members of a group when processing the request are neither sent to nor received by the originator.

23 Claims, 2 Drawing Sheets

HIDDEN GROUP MEMBERSHIP IN CLUSTERED COMPUTER SYSTEM

FIELD OF THE INVENTION

The invention is generally directed to computers and computer software, and in particular, to the group membership in a clustered computer system.

BACKGROUND OF THE INVENTION

Distributed computing systems have found application in a number of different computing environments, particularly those requiring high performance and/or high availability and fault tolerance. In a distributed computing system, multiple computers connected by a network are permitted to communicate and/or share workload. Distributed computing systems support practically all types of computing models, including peer-to-peer and client-server computing.

One particular type of distributed computing system is referred to as a clustered computing system. "Clustering" generally refers to a computer system organization where multiple computers, or nodes, are networked together to cooperatively perform computer tasks. An important aspect of a computer cluster is that all of the nodes in the cluster present a single system image—that is, from the perspective of a client or user, the nodes in a cluster appear collectively as a single computer, or entity. In a client-server computing model, for example, the nodes of a cluster collectively appear as a single server to any clients that attempt to access the cluster.

Clustering is often used in relatively large multi-user computing systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group. Often, groups are used to manage particular hardware and/or software resources and provide access to those resources by other entities in a computer system.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

Coincident with the technological advances in other computing technologies, clustered computer systems have become more powerful and complex. Whereas clustering was once limited to only a few local, interconnected physical machines, clustered computer systems are increasingly being called upon to provide cluster services across tens or hundreds of geographically dispersed physical machines. As a result of such advances, communication between the members of different groups, as well as with the originators of requests made to different groups, can present significant performance and scalability problems in a clustered computer system. Within this context, an originator may be considered to be a process or job that submits a request to the appropriate group to perform some action, and typically, an originator is required to be on a cluster node in order to issue requests and receive results from a group that is resident in a clustered computer system.

Whenever an originator wishes to access a resource, a request is typically sent by the originator to a member of the group responsible for the resource, and that group member broadcasts the request to all the group members using group communication, causing the members of the group to execute a protocol to perform the request. The result of the protocol (e.g., success or failure) is then sent to the originator via the group member to which the originator initially sent the request.

Two principal methods have conventionally been used to communicate a request from an originator to a group member. One method, referred to as a "cluster-wide group," requires that there be a group member on every cluster node, so that an originator can always send a local message to a group member that is on the same node. Another method, referred to as a "send and forward" method, does not require a group member on every cluster node. Instead, an originator sends the request to a group member that can be on either the local node or a different cluster node. That node may then need to forward the request to another node if a group member is not on that node.

With send and forward, an originator often needs to determine which node (sometimes referred to as a "leader node") to send a request to. Since any cluster node can have an originator, the cluster typically needs a global repository that an originator can access to determine which is the leader node for a given group. Having one global repository is not normally a good cluster practice (given that it is single point of failure), so the repository is usually replicated on all cluster nodes. The repository has the leader node for all groups, and the repository itself usually forms its own group, or is part of another cluster-wide group. Each group updates the repository with its leader node information, and then the repository group broadcasts the information to all nodes. The leader node information then does not have to be sent again unless the leader node changes for a group.

With either method, however, the potential overhead associated with getting a request from an originator to a group member can be excessively burdensome in some clustered computer systems. With cluster-wide groups, for example, a significant performance degradation can occur if the resource the group represents is only on a small subset of the total number of cluster nodes. For example, assume 100 nodes in a cluster, but only 2 nodes of those nodes actually host a requested resource. With cluster-wide groups, the group that manages the resource would have members on all of the 100 nodes, including 98 nodes that are not capable of hosting the resource, and 100 messages would be needed to broadcast the request to the group, resulting in a 98 message overhead per originator request. Also, if a protocol requires synchronization phases (where each group member sends a message and the protocol does not proceed until all members send their respective messages), the number of protocol messages can rise quickly. Using the same example as above but adding in one synchronization phase, 200 messages would be needed even though the protocol actually only needs four.

With send and forward, there is little or no protocol message overhead because the group doesn't have members that aren't needed. However, forwarding adds extra complexity with the forwarding mechanism and in keeping the global repository accurate. The complexity is particularly evident in error situations, such as when the node that a request was forwarded to fails during a protocol. For example, if a node that originally forwarded a request to another group member fails before the protocol completes, then the other group member has to be able to return the protocol result to the originator, but without using the original pathway provided by the failed member. Problems such as finding a new leader (keeping in mind that a new leader may never be selected if all group members fail), and having a copy of the request on the originator node until the request reaches the new leader (in case one of the nodes forwarded to fails before the message was forwarded again), may be encountered, and are complicated by the need to forward messages to and from an originator. This logic is executed during one of the most critical times in a cluster—reacting to a failure, or perhaps multiple failures. Having highly reliable and fault-tolerant code is a necessity, but this logic is difficult to test and design.

Therefore, a significant need exists in the art for manner of providing access to a group in a clustered computer system that has reduced overhead and greater reliability than has heretofore been supported by conventional clustered computer systems.

SUMMARY OF THE INVENTION

The invention addresses these and other problems associated with the prior art by providing an apparatus, program product and method that utilize hidden group membership to facilitate the processing of originator requests to a group in a clustered computer system. With hidden group membership, a requesting originator is temporarily joined to a group in such a manner that the originator is provided with limited privileges or access rights, e.g., so that some of the messages sent by the members of a group when processing the request are neither sent to nor received by the originator. As such, group communication may be used to return responses and results directly to the originator, and without relying on a forwarding mechanism, while eliminating the need for cluster-wide groups.

Consistent with one aspect of the invention, a request may be processed in a clustered computer system, by, in a first node among a plurality of nodes in the clustered computer system, receiving a request from an originator resident on the first node, where the request is directed to a group that is resident in the clustered computer system, and where the originator is not a member of the group when the request is received. Then, in response to receiving the request, the originator may be temporarily joined to the group with limited privileges, such that a response may be returned to the request to the originator through group communication.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter utilize "hidden" group membership to enable an originator of a request to a cluster group to temporarily communicate with the group using group communication, and thus communicate requests to and receive responses from the group while the originator is participating as a "hidden" member of the group. The originator, as a hidden member, is granted limited privileges or access rights, typically so that only a subset of the messages communicated between the regular (non-hidden) members of the group are made available to the hidden member.

Conventional mechanisms for providing originator access to the resources managed by a group are typically characterized as having excessive overhead or being unduly complex and difficult to implement to ensure suitable reliability and fault tolerance. The use of cluster-wide groups, for example, can be overly inefficient when groups are established in larger clusters where the resources being managed by such groups are only capable of being managed by a small subset of the nodes in the cluster, e.g., where a resource is only capable of being managed by 2 out of 100 possible nodes in a cluster. The use of send and forward, while eliminating the overhead of multiple unnecessary group members, introduces substantial complexity in terms of maintaining a global repository and reliably handling the forwarding of messages between an originator and the members of a group.

With hidden group membership, however, an originator is permitted to temporarily join a group, but only with limited privileges or access rights, i.e., with only a subset of the privileges or access rights that are granted to the regular, permanent members of the group. In the illustrated embodiments, for example, hidden members are only permitted to receive a protocol result message and not any other group messages. Furthermore, the other group members do not process the originator membership, and from their perspective they operate as though the originator group member does not exist. Group communication in the clustering infrastructure keeps track of the membership status to ensure the correct group messages are sent only to the appropriate group members. In addition, after the result is delivered to the originator, the originator is automatically removed from the group.

Figure 1:
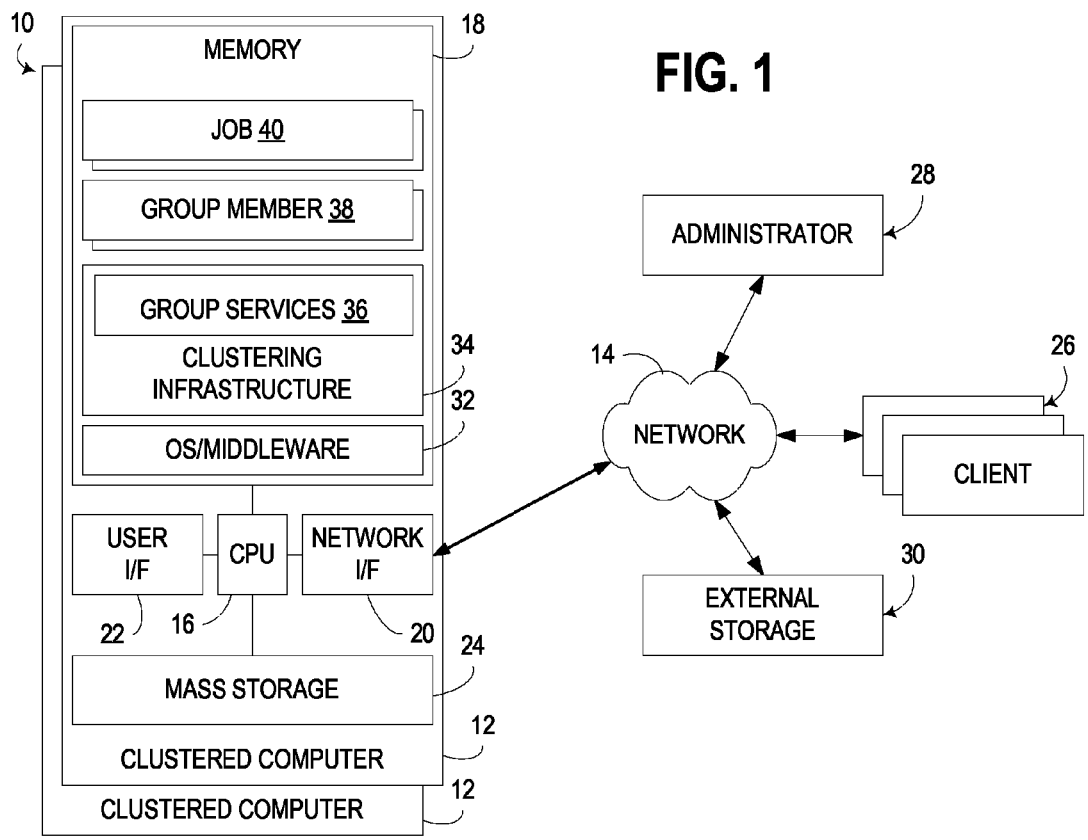
FIG. 1 is a high level block diagram of a clustered computer system that supports hidden group membership consistent with the invention.

Turning now to the Drawings, wherein like numbers denote like parts throughout the several views, FIG. 1 illustrates an exemplary embodiment of a clustered computer system, or cluster 10 that supports hidden group membership consistent with the invention. Cluster 10 includes a plurality of clustered computers, or nodes 12, interfaced with one another via a network 14. As will be appreciated in the art, network 14 may be implemented using any combination of LAN's, WAN's, point-to-point interconnects, and/or various other networking topologies. Furthermore, network 14 may represent multiple distinct networks in some embodiments. Computers 12 may be located in close geographical proximity with one another, or may be geographically dispersed.

Each computer 12 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Each computer 12 generally includes a central processing unit (CPU) 16 including one or more system processors and coupled to a memory or main storage 18, typically through one or more levels of cache memory (not shown). Furthermore, CPU 16 may be coupled to additional peripheral components, e.g., one or more networks 14 via a network interface 20, various input/output devices (e.g., a control panel, display, keyboard, mouse and/or dedicated workstation, etc.) via a user interface 22, and mass storage 24 (e.g., a DASD or one or more disk drives). Any number of alternate computer architectures may be used in the alternative.

Also illustrated as coupled to network 14 are a plurality of client computers 26, which may be connected to computers 12 via private and/or public networks such as the Internet to perform tasks using the application server architecture described herein. For administration purposes, one or more administrator computers 28 may also be coupled to network 14. In addition, it will be appreciated that various other types of components may be coupled to network 14, e.g., external backend storage 30 such as a storage area network, network addressed storage, or various other persistent storage systems known in the art.

Each computer 12 is further configured to host a number of levels of software suitable for implementing a clustered or distributed computing environment. Shown resident in memory 18 is operating system and/or middleware program code 32, as well as a clustering infrastructure 34, e.g., the System 15 clustering infrastructure available from International Business Machines Corporation, the assignee of the present invention.

Within the clustering infrastructure are provided various group services 36, including, among other services, group communication services and group management services. The group communication services provide an ordered and reliable messaging-based communications scheme that enables multiple members 38 of a group to communicate with one another and collectively perform tasks, or protocols, on behalf of the group. For example, group communication services may handle the communication of requests and acknowledgments between members of a group, and track the receipt of acknowledgments to requests to ensure that members progress through a protocol in a synchronized manner. It will be appreciated that a number of different group communication schemes, suitable for use in various clustering environments, may be used consistent with the invention. The group management services cooperate in managing the creation, destruction and modification of groups, including the addition (or joining) and removal (or leaving) of members to and from existing groups.

Group members 38 have access to clustering infrastructure 34 to access group services 36. It will be appreciated that one or more members 38 of a group may reside on a particular node 12, and that certain groups may have no members on certain nodes 12. Clustered computers may also utilize logical partitioning, so a single physical machine may implement multiple nodes 12 in the system, with different members 38 of a group being resident in different logical partitions of the same physical machine.

Each node 12 may also include one or more jobs 40, which represent various applications and tasks that execute on a node, and which in some instances may access cluster groups in cluster 10. Whenever such jobs 40 access a cluster group by issuing requests thereto, such jobs operate as originators of the requests, which as noted above, may be temporarily joined to a group as a hidden member in order to facilitate handling of the request by the group. It will also be appreciated that a job may operate as a proxy for a client 26 or administrator 28 to access groups on behalf of such entities. In addition, while in the illustrated embodiment an originator is required to be resident on a cluster node, in some embodiments, a job executing on an external system such as a client or administrator computer may serve as an originator for the purposes of the invention.

The discussion hereinafter will focus on the specific routines utilized to implement the above-described hidden group membership functionality. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical, recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. For example, the invention may be implemented in a clustered computer system where clustering is not implemented within an application server environment. Those skilled in the art will recognize that other alternative hardware and/or software environments may be used without departing from the scope of the invention.

Figure 2:
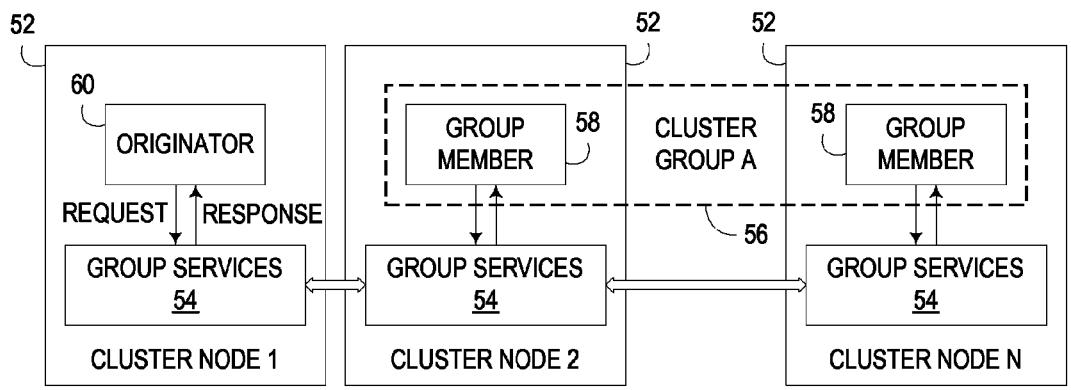
FIG. 2 is a block diagram illustrating the joining of an originator as a hidden member to a group in a clustered computer system consistent with the invention.
Figure 3:
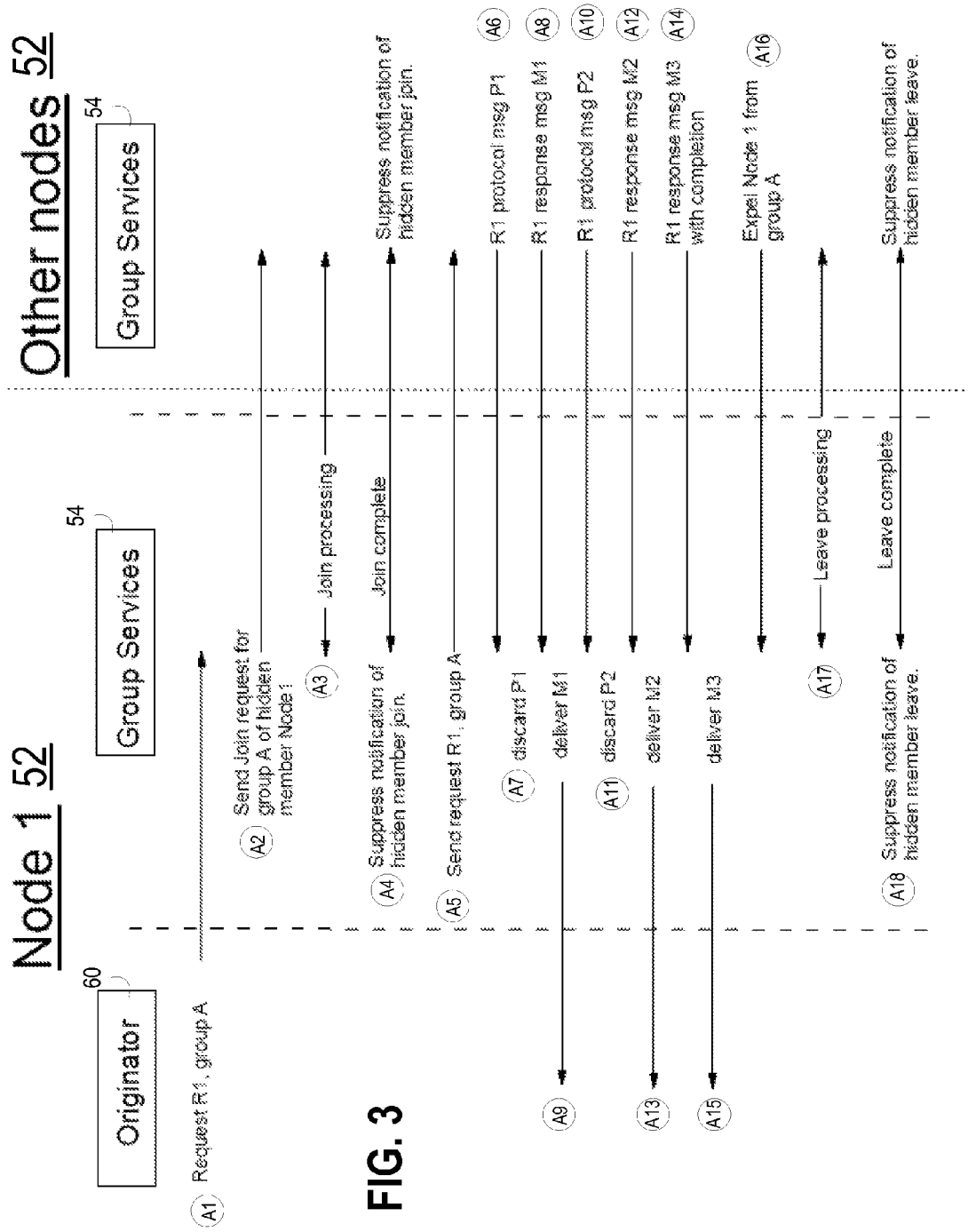
FIG. 3 is an interaction diagram illustrating the interaction between components in the clustered computer system of FIG. 2 during the processing of an originator request, and using hidden group membership to handle the request.

With reference now to FIGS. 2 and 3, an exemplary implementation of hidden group membership consistent with the invention is illustrated. FIG. 2, in particular, illustrates a clustered computer system 50 including a plurality of nodes 52, additionally identified as nodes 1 . . . N. Each node 52 includes group services 54 resident thereon, and including in the least a group communication service to handle group communication between group members. Nodes 2 . . . N are shown including a cluster group 56 (also designated as group "A"), and including a group member 58 resident on each such node. Node 1 includes an originator 60 wishing to access a resource managed by group 56, and an interface is provided via group services 54 in cluster node 1 to receive requests from originator 60 and to return responses to such requests back to originator 60.

FIG. 3 illustrates a process for handling a request to access a resource managed by group 56, and originated from originator 60. In particular, as shown at step A1, in order to request a task to be performed by group A, originator 60 issues a request R1 to group A via a call to group services 54 on the same node as originator 60 (node 1). Of note, no regular (non-hidden) member need be resident on node 1, although such a member could be resident in some embodiments.

Although requests may be implemented in a number of manners, in the illustrated embodiment, a request may be implemented as an API call to group services, and responses may be returned in a similar manner to API responses. In addition, in some embodiments an originator may consult a directory to locate a group to which a request should be sent, and as such, the originator need not be resident on a cluster node upon which another group member is resident.

A request may be used to request practically any appropriate service from a cluster group, e.g., requests to start or end managed resources, requests to change attributes, requests to use or access resources, requests to failover resources, etc.

The request is given a unique ID that is assigned by group services 54, and group services 54 is configured to provide results to originator only for those messages corresponding to that unique request ID.

Next, as shown at step A2, group services 54 in node 1 sends a "join" request to all other nodes having members of group A resident thereon, with the join request indicating that the originator is to be joined as a "hidden" member. The originator may be identified as a "hidden" member by virtue of a flag or bit being set in the join request. As group communication exists on all cluster nodes already, there is no extra overhead required to handle the processing of the request on node N1.

As shown at step A3, join processing then occurs in all of the nodes having members of group A, using conventional join processing algorithms. For example, with one join processing algorithm, a leader of a group may initiate a join by sending a message to the other nodes to start a synchronization phase, whereby all nodes exchange states. Then, when all nodes confirm the same state, all nodes return acknowledgement responses, enabling the leader to send a view message with the new membership for the group. In the case of a hidden member join, the view message may tag the new member as hidden such that, when each node receives the view, the group services suppresses notification to the other members.

Next, as shown at step A4, upon completion of the join processing, group services 54 on each node 52 suppresses notification of the join of the hidden member to both originator 60 and each non-hidden member 58 of group A. Consequently, unlike a conventional join where each existing member is notified of the new member, no such notification is generated for originator 60, rendering originator 60 "hidden" from the perspective of the other members 58 of group A.

Once join processing is complete, request R1 is then sent to all of the non-hidden members of group A, thus initiating a protocol to handle request R1.

As illustrated in steps A6-A14, a number of different messages may be passed between members of group A during the handling of a protocol. One type of message is a protocol message, e.g., acknowledge or synchronization messages, or other group-internal or protocol-specific messages that need not be provided to the originator. For example, a protocol message may be a synchronization message associated with reliable messaging in an ordered protocol to ensure that no member can proceed with the protocol until all members are ready to proceed. In the event of any such protocol message being sent by a member of group A (e.g., messages P1 and P2 sent in steps A6 and A10), group services 54 on each node in which a non-hidden member resides will forward the message to the member. However, originator 60, being a hidden member with limited privileges, does not receive such messages, and as such, as shown at steps A7 and A11, messages P1 and P2 are discarded, and notification of originator 60 is suppressed. A protocol message therefore provides a mechanism through which internal group communications can be performed without notifying the originator. No protocol messages sent in the group are sent to the originator, and the originator can't eavesdrop on the protocol, nor can the originator snoop on other protocols the group may be executing.

Another type of message that may be forwarded by a group member to the other members of the group is designated as a response message, indicating that all or a portion of the protocol has been completed, and optionally providing requested data to the requesting originator. In the event of any such response message being sent by a member of group A (e.g., messages M1, M2 and M3 sent in steps A8, A12 and A14), group services 54 on each node (including those in which a non-hidden member resides) will forward the message to the respective member, as shown at steps A9, A13 and A15). A response message therefore provides a mechanism through which an originator may be notified of the progress of a group protocol, as well as provided with any data requested by the originator.

A response message may also be further characterized as a "response with completion" message that indicates that the protocol has been completed. As with other response messages, result data may also be returned to an originator via such a message. In the event of any such response message being sent by a member of group A (e.g., message M3 sent in step A14), group services on each node (including node 1) will forward the message to the respective member, thus indicating to the originator that the protocol has now been completed.

Group communication typically associates the unique ID assigned to the protocol, and sends the response with completion message to the originator with that ID associated with it. In addition, a response with completion message may be distinguished from other response messages in a number of manners, e.g., via a unique code, flag or field in the message.

A response with completion message also has the effect of automatically expelling the originator from group A. In particular, as shown at step A16, once the response with completion message has been communicated, group services 54 on a node other than that upon which the originator resides requests to expel the originator on Node 1 from group A. Conventional leave processing then occurs at step A17. Then, as shown at step A18, upon completion of the leave processing, group services 54 on each node 52 suppresses notification of the leave of the hidden member to both originator 60 and each non-hidden member 58 of group A. Consequently, unlike a conventional leave where each existing member is notified of the departing member, no such notification is generated for originator 60.

While the invention may be implemented in an innumerable number of other computer architectures, one particular architecture that is well suited to use hidden group membership is the i5 cluster architecture available from International Business Machines Corporation, the assignee of the instant application. In such an architecture, whenever an originator group join is requested, the join may be tagged for hidden membership. Group services may then remember the tag and not send any group messages other than the protocol result to that group member. Upon sending the result, the group services may then automatically expel the originator and suppress sending a notification to other group members. Also in such an architecture, the group services message header may be expanded to include a unique ID field that is associated with each originator. Additionally, the group services may define a message that the group is required to send that indicates the protocol is done, and whatever data is to be sent to the originator.

Embodiments consistent with the invention therefore provide reduced overhead as compared to cluster-wide groups, and provide greater reliability and reduced complexity as compared to send and forward by eliminating the need to forward messages and maintain group repositories. It will also be appreciated that a hidden member within the context of the invention is more than a mere "subscriber" to a group, as subscribers to groups are typically not permitted to send messages to a group, are not automatically expelled from groups, are not restricted on only receiving information on certain protocols, and are not always aware of when a protocol ends.

Other modifications will be apparent to one of ordinary skill in the art. Therefore, the invention lies in the claims hereinafter appended.

What is claimed is:

1. A method of processing a request in a clustered computer system, the method comprising:
in a first node among a plurality of nodes in the clustered computer system, receiving a request from an originator resident on the first node, wherein the request is directed to a group that is resident in the clustered computer system and that is configured to manage a resource, wherein the request requests performance of a service associated with the resource managed by the group, wherein the group includes a plurality of regular members that communicate with one another via group communication using an ordered message-based scheme to maintain synchronization between the plurality of regular members, and wherein the originator is not a member of the group when the request is received;
in response to receiving the request, temporarily joining the originator to the group with limited privileges such that the originator is configured to receive only a subset of messages communicated between the plurality of regular members;
issuing the request to the regular members of the group through group communication while the originator is temporarily joined to the group with limited privileges to initiate performance of the service by the group;
returning a response to the request to the originator through group communication; and
automatically removing the originator from the group after returning the response to the originator.

2. The method of claim 1, wherein each regular member in the group is notified whenever another regular member is removed from the group, the method further comprising suppressing notification of regular members of the group of the removal of the originator from the group.

3. The method of claim 1, wherein temporarily joining the originator to the group includes temporarily joining the originator as a hidden member of the group.

4. The method of claim 1, wherein the plurality of regular members in the group are configured to communicate protocol messages with one another, and wherein the originator does not receive the protocol messages between regular members while temporarily joined to the group.

5. The method of claim 1, further comprising excluding the originator from protocol messages communicated between members of the group while the originator is temporarily joined to the group.

6. The method of claim 1, further comprising assigning an identifier to the request, wherein returning the response to the originator includes returning a response to the originator that includes the identifier.

7. The method of claim 1, wherein receiving the request, temporarily joining the originator and returning the response are performed in part by a group communication service in a clustering infrastructure resident on the first node.

8. The method of claim 1, wherein each regular member in the group is notified whenever another regular member is joined to the group, the method further comprising suppressing notification of regular members of the group of the join of the originator to the group.

9. The method of claim 1, wherein each regular member of the group is permitted to send messages to other regular members of the group, the method further comprising precluding the originator from sending messages to regular members of the group while the originator is temporarily joined to the group.

10. The method of claim 1, wherein the limited privileges include a restriction against sending messages to the regular members of the group, a restriction against receiving protocol messages, and a restriction against receiving notification of membership changes, wherein each regular member is permitted to send messages to other regular members of the group, to receive protocol messages, and to receive notification of membership changes.

11. The method of claim 1, wherein returning the response to the request to the originator includes identifying completion of a group protocol in the response.

12. An apparatus, comprising:
at least one processor resident in a first node among a plurality of nodes in a clustered computer system; and
program code configured to be executed by the at least one processor to receive a request from an originator resident on the first node, wherein the request is directed to a group that is resident in the clustered computer system and that is configured to manage a resource, wherein the request requests performance of a service associated with the resource managed by the group, wherein the group includes a plurality of regular members that communicate with one another via group communication using an ordered message-based scheme to maintain synchronization between the plurality of regular members, and wherein the originator is not a member of the group when the request is received, the program code further configured to temporarily join the originator to the group with limited privileges in response to receiving the request such that the originator is configured to receive only a subset of messages communicated between the plurality of regular members, issue the request to the regular members of the group through group communication while the originator is temporarily joined to the group with limited privileges to initiate performance of the service by the group, return a response to the request to the originator through group communication, and the program code further configured to automatically remove the originator from the group after returning the response to the originator.

13. The apparatus of claim 12, wherein each regular member in the group is notified whenever another regular member is removed from the group, and wherein the program code is further configured to suppress notification of regular members of the group of the removal of the originator from the group.

14. The apparatus of claim 12, wherein the program code is configured to temporarily join the originator to the group as a hidden member of the group.

15. The apparatus of claim 12, wherein the plurality of regular members in the group are configured to communicate protocol messages with one another, and wherein the originator does not receive the protocol messages between regular members while temporarily joined to the group.

16. The apparatus of claim 12, wherein the program code is further configured to exclude the originator from protocol messages communicated between members of the group while the originator is temporarily joined to the group.

17. The apparatus of claim 12, wherein the program code is further configured to assign an identifier to the request, and to return the response to the originator by returning a response to the originator that includes the identifier.

18. The apparatus of claim 12, wherein the program code comprises a group communication service in a clustering infrastructure resident on the first node.

19. The apparatus of claim 12, wherein each regular member in the group is notified whenever another regular member is joined to the group, and wherein the program code is further configured to suppress notification of regular members of the group of the join of the originator to the group.

20. The apparatus of claim 12, wherein each regular member of the group is permitted to send messages to other regular members of the group, wherein the program code is further configured to preclude the originator from sending messages to regular members of the group while the originator is temporarily joined to the group.

21. The apparatus of claim 12, wherein the limited privileges include a restriction against sending messages to the regular members of the group, a restriction against receiving protocol messages, and a restriction against receiving notification of membership changes, wherein each regular member is permitted to send messages to other regular members of the group, to receive protocol messages, and to receive notification of membership changes.

22. A clustered computer system, comprising:
a plurality of nodes including a first node which includes at least one processor; and
program code resident in the first node and configured to be executed by the at least one processor to receive a request from an originator resident on the first node, wherein the request is directed to a group that is resident in the clustered computer system and that is configured to manage a resource, wherein the request requests performance of a service associated with the resource managed by the group, wherein the group includes a plurality of regular members that communicate with one another via group communication using an ordered message-based scheme to maintain synchronization between the plurality of regular members, and wherein the originator is not a member of the group when the request is received, the program code further configured to temporarily join the originator to the group with limited privileges in response to receiving the request such that the originator is configured to receive only a subset of messages communicated between the plurality of regular members, issue the request to the regular members of the group through group communication while the originator is temporarily joined to the group with limited privileges to initiate performance of the service by the group, return a response to the request to the originator through group communication, and the program code further configured to automatically remove the originator from the group after returning the response to the originator.

23. A program product, comprising:
a non-transitory computer readable medium; and
program code resident in the non-transitory computer readable medium and configured to be executed on a first node among a plurality of nodes in a clustered computer system, the program code configured to receive a request from an originator resident on the first node, wherein the request is directed to a group that is resident in the clustered computer system and that is configured to manage a resource, wherein the request requests performance of a service associated with the resource managed by the group, wherein the group includes a plurality of regular members that communicate with one another via group communication using an ordered message-based scheme to maintain synchronization between the plurality of regular members, and wherein the originator is not a member of the group when the request is received, the program code further configured to temporarily join the originator to the group with limited privileges in response to receiving the request such that the originator is configured to receive only a subset of messages communicated between the plurality of regular members, issue the request to the regular members of the group through group communication while the originator is temporarily joined to the group with limited privileges to initiate performance of the service by the group, and return a response to the request to the originator through group communication, and the program code further configured to automatically remove the originator from the group after returning the response to the originator.

* * * * *